United States Patent
Alotaibi et al.

(10) Patent No.: US 12,374,878 B2
(45) Date of Patent: Jul. 29, 2025

(54) METHOD OF ESTIMATING RELATIVE HUMIDITY IN A MACHINE

(71) Applicant: SAUDI ARABIAN OIL COMPANY, Dhahran (SA)

(72) Inventors: Nasser Monif Alotaibi, Dhahran (SA); Ali Ahmed Alameer, Saihat (SA); Zeyad Tariq Balkhyour, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 273 days.

(21) Appl. No.: 18/318,314

(22) Filed: May 16, 2023

(65) Prior Publication Data
US 2024/0385135 A1 Nov. 21, 2024

(51) Int. Cl.
| | | |
|---|---|---|
| *H02H 1/00* | (2006.01) | |
| *G05D 22/00* | (2006.01) | |
| *G05D 22/02* | (2006.01) | |
| *H02H 7/08* | (2006.01) | |

(52) U.S. Cl.
CPC ............ *H02H 7/08* (2013.01); *G05D 22/02* (2013.01); *H02H 1/0007* (2013.01)

(58) Field of Classification Search
CPC .. F24F 2110/20; F25B 2700/02; G05D 22/00; G05D 22/02; H02H 1/007; H02H 7/08
See application file for complete search history.

(56) References Cited

U.S. PATENT DOCUMENTS

2016/0054018 A1* 2/2016 Motodani ............... F24F 11/46
700/276

OTHER PUBLICATIONS

Boukhriss, M. et al., "Study of thermophysical properties of a solar desalination system using solar energy"; Desalination and Water Treatment; vol. 51, Issue 4-6; pp. 1290-1295; 2013 (6 pages).

* cited by examiner

*Primary Examiner* — Jonathan Bradford
(74) *Attorney, Agent, or Firm* — Osha Bergman Watanabe & Burton LLP

(57) ABSTRACT

A method for estimating relative humidity inside an electrical machine includes determining a measured rate of change (ROC) of temperature inside an electrical machine. A ratio of the measured ROC to a reference ROC is calculated, where the ratio is equal to an average specific heat of the electrical machine. The average specific heat of the electrical machine and an air temperature value are then compared to known specific heat values of dry air and water corresponding to a known relative humidity values for a range of air temperatures. A relative humidity value inside the electrical machine is estimated based on the comparison.

16 Claims, 3 Drawing Sheets

METHOD OF ESTIMATING RELATIVE HUMIDITY IN A MACHINE

BACKGROUND

Humidity sensors are utilized to measure the humidity in an environment and convert the measurement to a corresponding electrical signal. There are two types of humidity sensors: relative humidity sensors and absolute humidity sensors. Relative humidity is determined by comparing the live humidity measurement at a given temperature to the maximum amount of humidity for air at the same temperature. Therefore, relative humidity sensors also measure temperature in order to determine relative humidity.

Maintaining proper temperature and humidity conditions is necessary for optimal functioning of electric machinery. Excessive moisture may cause a motor to run hot. Operation in high humidity and/or high temperature conditions is known to affect the reliability of machinery. Specifically, humidity ingress into a motor frame impacts the reliability of stator windings, causing them to degrade and fail prematurely. Moisture may penetrate the insulation material and degrade its insulating properties. The most common cause of motor failure is low resistance, which is caused by the degradation of the insulation of the windings.

Installing humidity sensors inside a machine's frame is not straightforward, requiring physical changes or modifications to the machine setup. Currently, there is no method for measuring relative humidity inside electrical machines despite its significance in maintaining machine reliability.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method for estimating relative humidity inside an electrical machine. A measured rate of change (ROC) of a temperature inside an electrical machine is determined. A reference ROC of a temperature inside the electrical machine is also determined. A ratio of the measured ROC to the reference ROC is then calculated. The ratio is equal to an average specific heat of the electrical machine. An air temperature value for the electrical machine is also determined. The average specific heat of the electrical machine and the air temperature value are compared to a set of known specific heat values of dry air and water corresponding to a set of known relative humidity values for a range of air temperatures. Based on the comparison, a relative humidity value inside the electrical machine is estimated.

In another aspect, the electrical machine is an electrical motor.

In another aspect, the electrical machine is shutdown when the relative humidity value exceeds a predetermined threshold value.

In another aspect, the electrical machine is prevented from re-starting when the relative humidity value exceeds a predetermined threshold value.

In another aspect, an alert is generated when the relative humidity value exceeds a predetermined threshold value.

In another aspect, the measured ROC is measured during a starting operation of the electrical machine, and the reference ROC is measured during a starting operation of the electrical machine.

In another aspect, the measured ROC is measured during a shutdown operation of the electrical machine, and the reference ROC is measured during a shutdown operation of the electrical machine.

In another aspect, a resistance temperature detector (RTD) reading for the electrical machine is obtained during a starting operation or a shutdown operation, and a reference RTD reading for the electrical machine is obtained during a corresponding starting or shutdown operation.

In another aspect, an ambient temperature value is obtained, and a difference $T_2$ between the RTD reading and the ambient temperature value is determined. Then, a difference $T_1$ between the reference RTD reading and the ambient temperature value is determined.

In another aspect, the ratio of the measured ROC to the reference ROC is calculated according to the following:

$$\frac{\left(\frac{dT}{dt}\right)_1}{\left(\frac{dT}{dt}\right)_2},$$

where t denotes the time from when the starting operation or the shutdown operation occurred to when thermal energy was produced by the electrical machine.

In another aspect, the air temperature value is determined using the RTD reading.

In one aspect, embodiments disclosed herein relate to a system for estimating relative humidity inside an electrical machine. The system comprises an electrical machine and one or more temperature sensors proximate the electrical machine configured for obtaining a set of temperature measurements for the electrical machine during a starting operation or a shutdown operation as well as an air temperature value. The system further comprises an analysis unit configured for performing multiple operations. The analysis unit determines a measured rate of change (ROC) of a temperature inside the electrical machine based on the set of temperature measurements. The analysis unit then determines a reference ROC of a temperature inside the electrical machine. A ratio of the measured ROC to the reference ROC is calculated by the analysis unit, where the ratio is equal to an average specific heat of the electrical machine. The analysis unit compares the average specific heat of the electrical machine and the air temperature value to a set of known specific heat values of dry air and water corresponding to a set of known relative humidity values for a range of air temperatures. A relative humidity value inside the electrical machine is estimated by the analysis unit based on the comparison. The system further comprises a control unit configured for causing a mechanical operation to be performed based on the estimated relative humidity value.

Other aspects and advantages of the claimed subject matter will be apparent from the following description and the appended claims.

DETAILED DESCRIPTION

In one aspect, embodiments disclosed herein relate to a method for detecting relative humidity inside electrical machines. Specifically, relative humidity is calculated through an engineered logic. Rather than installing a humidity sensor inside a machine frame, relative humidity is assessed by monitoring the rate of change of the temperature inside the machine. In one or more embodiments, the machine is an electric rotating machine. The electric rotating machine may be an electrical motor or an electrical generator.

Figure 1:
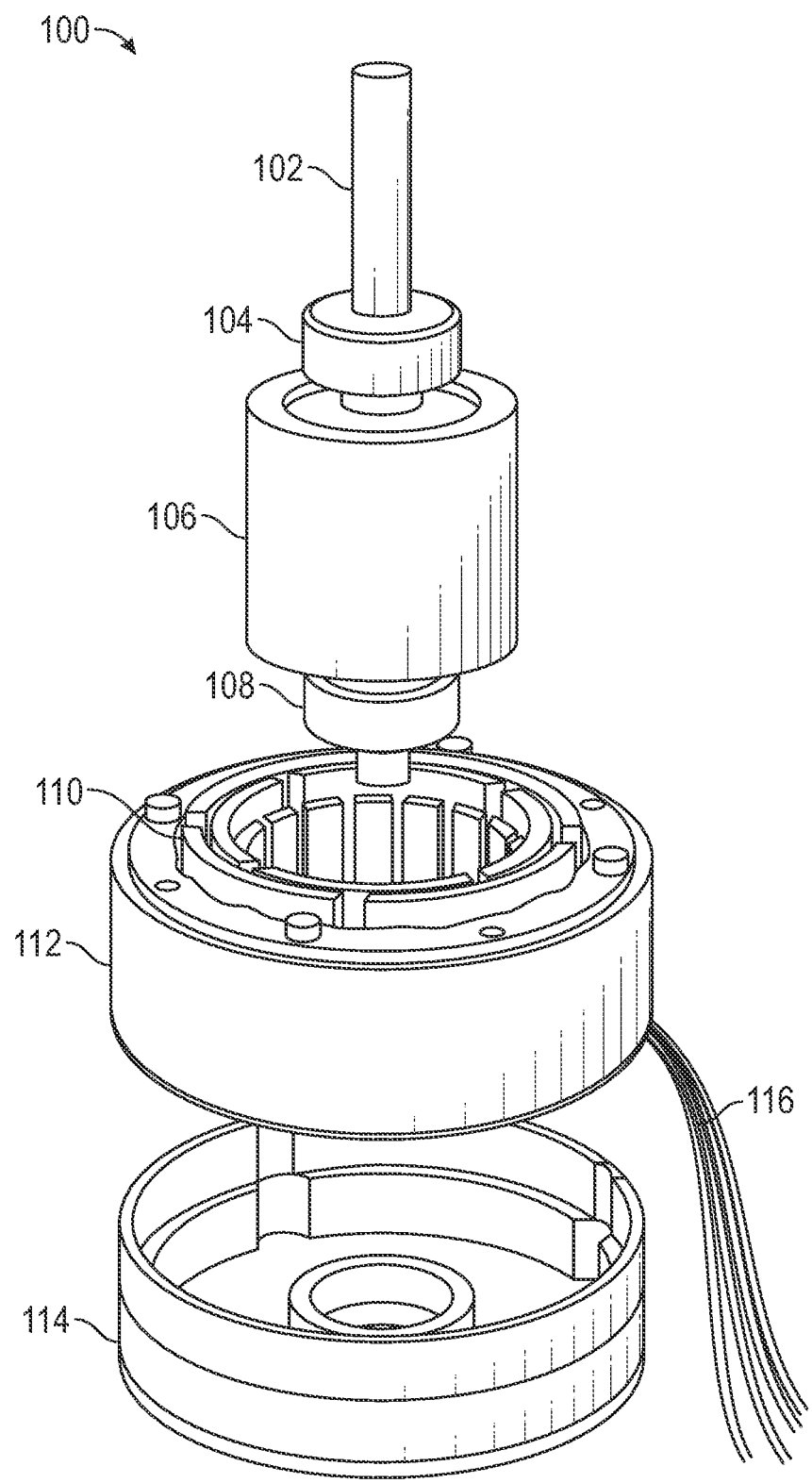
FIG. 1 illustrates an exemplary electric motor according to one or more embodiments of the present disclosure.

The method described herein may be used to estimate the relative humidity of an electrical motor, such as the exemplary electrical motor 100 depicted in FIG. 1. The components of the exemplary electrical motor 100 include an output shaft 102, a first bearing 104, a rotor 106, a second bearing 108, a winding 110, a stator 112, a bracket 114, and a wire 116 to a power supply. As can be appreciated by one skilled in the art, the exemplary electrical motor 100 illustrated in FIG. 1 is provided as a non-limiting example of one type of an electrical machine and is not intended to limit the invention to any specific electrical machine.

Figure 2:
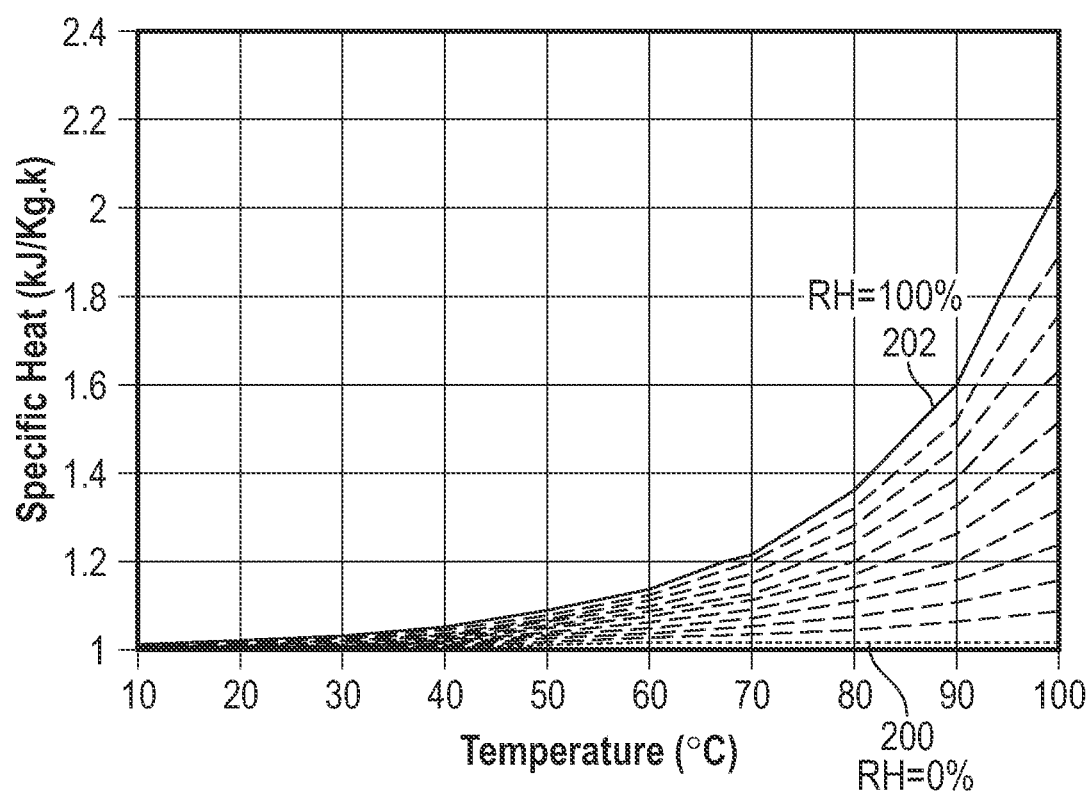
FIG. 2 illustrates the effect of temperature on the specific heat of a mixture of dry air and water vapor at different relative humidity values according to prior art.

The invention according to one or more embodiments of the present disclosure is based on the knowledge that the measured rate of change (ROC) of the temperature of air differs depending on the relative humidity of the air. FIG. 2 illustrates the effect of a range of air temperature values on the specific heat of a mixture of dry air and water vapor at different relative humidity percentages from 0% (curve 200) to 100% (curve 202). As shown in FIG. 2, at lower temperatures of approximately 50-60° C., relative humidity does not have a notable effect on the specific heat of the mixture. However, as the air temperature increases, particularly from 80° C. and higher, the effect of humidity on the specific heat becomes significant.

In one or more embodiments, the ROC of a temperature rise of an electrical machine's winding during a starting operation and/or a shutdown operation is monitored and correlated with a humidity level inside the machine. The engineering logic of this process is explained in detail below.

The thermal energy of a machine system may be determined according to the following:

$$Q = Cv * \Delta T, \tag{1}$$

where Q is the thermal energy produced by the machine, Cv is the specific heat of air, and T is the temperature inside the machine's frame.

Both sides of equation (1) may be differentiated with respect to time as follows:

$$\frac{dQ}{dt} = Cv * \frac{dT}{dt}, \tag{2}$$

where t denotes the time from when the starting operation or the shutdown operation occurred to when the thermal energy was produced. The time t may be expressed in seconds, minutes, or hours. Since temperature changes over a course of minutes during starting and shutdown operations in an electrical machine, t is generally expressed in minutes.

Since heat is released at a similar rate for a machine at a given temperature rise, equation (2) may be rewritten for two different shutdown/startup operations (1 and 2) for the same machine as:

$$Cv_1 * \left(\frac{dT}{dt}\right)_1 = Cv_2 * \left(\frac{dT}{dt}\right)_2. \tag{3}$$

Equation (3) may then be rewritten as:

$$\frac{\left(\frac{dT}{dt}\right)_1}{\left(\frac{dT}{dt}\right)_2} = \frac{Cv_2}{Cv_1}. \tag{4}$$

Equation (4) may be applied for two different startup operations given that the load is the same.

To estimate the relative humidity in a machine, the ROC of a temperature during one of a starting operation or a shutdown operation is compared with a corresponding reference starting or shutdown operation in the same machine. The reference starting and shutdown measurements are taken when the reference machine is new or recently overhauled and when the air inside the machine is confirmed dry. When comparing the measured ROC to the reference ROC, a startup operation is compared to a reference startup measured in the same machine. Likewise, a shutdown operation is compared to a reference shutdown measured in the same machine.

Equation (5) below may be used to calculate $Cv_2$, which is the specific heat for a current startup/shutdown operation of a machine. In equation (5), $Cv_1$ in equation (4) may be replaced with a value of 1, which is the specific heat for a dry machine (i.e., a reference machine).

$$\frac{\left(\frac{dT}{dt}\right)_1}{\left(\frac{dT}{dt}\right)_2} = \frac{Cv_2(T)}{1} \tag{5}$$

Because the specific heat is a function of temperature, equation (5) may be rewritten as a function of an average specific heat in an interval from a starting temperature $T_0$ to $T_1$ as follows:

$$\frac{\left(\frac{dT}{dt}\right)_1}{\left(\frac{dT}{dt}\right)_2} = \frac{1}{T_1 - T_0} \int_{T_0}^{T_1} Cv_2(T)\, dT. \tag{6}$$

Here, the temperatures $T_0$ and $T_1$ represent the temperature of the air inside the machine frame, and not the winding temperature. The winding temperature is typically displayed as resistance temperature detector (RTD) readings. In one embodiment, the temperature of the air inside the machine frame is calculated via measurements obtained from an air temperature sensor. In another embodiment, the temperature of the air inside the machine frame is determined using the temperature difference between the winding temperature and air temperature based on manufacturer data. In yet another embodiment, the temperature of the air inside the machine frame is estimated to be approximately 30 degrees (° C.) less than the RTD reading, which is the average difference based on empirical data.

To determine the relative humidity of the air inside the machine, the ratio of the ROC of a temperature during shutdown/startup of a given machine to a reference ROC of a temperature during shutdown/startup of the same machine may be calculated. The ratio is equal to the average specific heat of the machine according to equation (4). Using the data curves shown in FIG. 2, the calculated average specific heat for the machine may be compared to a specific heat value and air temperature in the plot. The relative humidity (RH) value of the machine may then be estimated as the RH value that corresponds to the similar specific heat value in the plot. Table 1 presents two sets of exemplary values for calculating the average specific heat for a machine according to one or more embodiments of the present disclosure.

TABLE 1

| | | |
|---|---|---|
| Shutdown RTD (° C.) | 80 | 65 |
| Reference Shutdown RTD(° C.) | 75 | 60 |
| Ambient Temperature (° C.) Value | 40 | 25 |
| $T_2$ (RTD - Ambient) (° C.) | 40 | 40 |
| $T_1$ (RTD - Ambient) (° C.) | 35 | 35 |
| $t_2$ (min) | 186 | 163 |
| $t_1$ (min) | 0 | 0 |
| $ROC = \left(\frac{dT}{dt}\right)$ | 0.026882 | 0.030675 |
| $Ratio = \frac{\left(\frac{dT}{dt}\right)_1}{\left(\frac{dT}{dt}\right)_2}$ | 1.141104294 | 0 |
| Air Temperature (° C.) (RTD −30) | 50 | 35 |
| RH from Graph | 90% | 0 |

Figure 3:
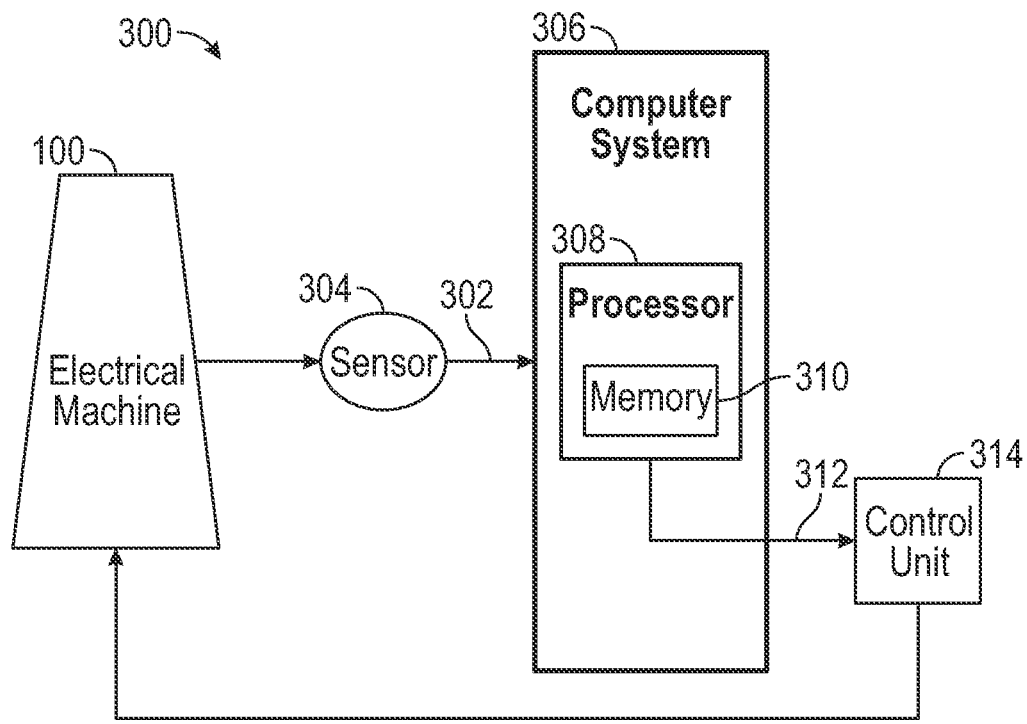
FIG. 3 illustrates a system for detecting relative humidity inside an electrical machine according to one or more embodiments of the present disclosure.

FIG. 3 depicts a system for estimating relative humidity inside an electrical machine. In the embodiment shown in FIG. 3, the system 300 receives input data 302, such as a set of temperature measurements, from one or more temperature sensors 304 (e.g., resistance temperature detector (RTD), air temperature sensor) inside or proximate the electrical machine. The input data 302 may be analyzed by an analysis unit, such as a computer system 306 including at least one computer processor 308. Although illustrated as a single computer processor 308 in FIG. 3, two or more processors may be used according to particular needs, desires, or particular implementations of the computer system 306. Generally, the computer processor 308 executes instructions and manipulates data to perform the operations of the computer system 306 and any algorithms, methods, functions, processes, flows, and procedures as described in the present disclosure.

The computer system 306 also includes a non-transitory computer readable medium, or a memory 310, that holds data for the computer system 306 or other components (or a combination of both) that can be connected to a network. For example, memory 310 can be a database storing data consistent with this disclosure. Although illustrated as a single memory 310 in FIG. 3, two or more memories may be used according to particular needs, desires, or particular implementations of the computer system 306 and the described functionality. While memory 310 is illustrated as an integral component of the computer system 306, in alternative implementations, memory 310 can be external to the computer system 306.

Following processing, analyzed data 312 may be transmitted to a control unit 314. The control unit 314, in turn, may cause mechanical operations to be performed based on the analyzed data 312. For example, the control unit 314 may act to cause the electrical machine to safely shutdown when the relative humidity exceeds a predetermined threshold value. Shutting down the machine serves to avoid potential damage to the electrical machine. Additionally, the control unit 314 may prevent the electrical machine from re-starting.

Figure 4:
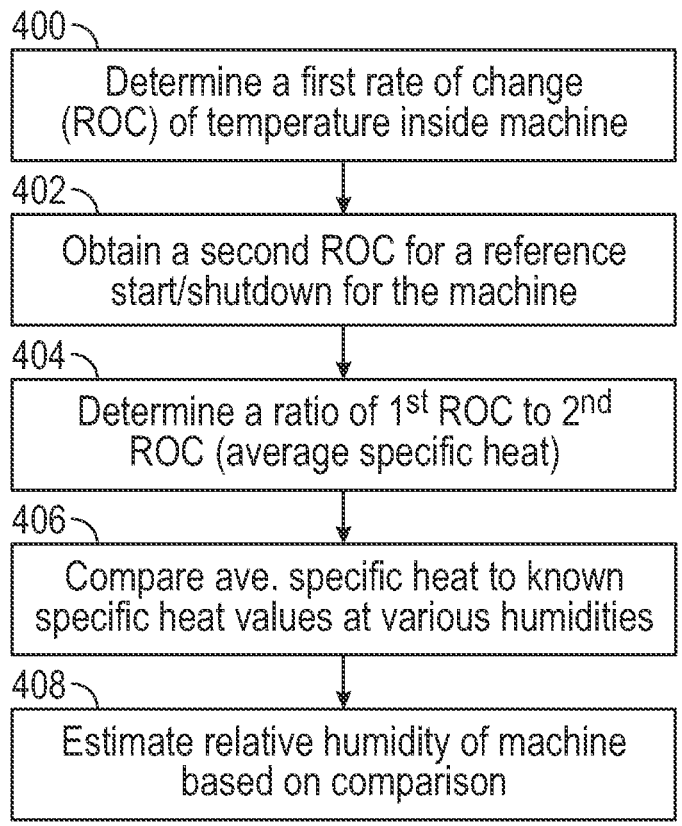
FIG. 4 is a flow diagram illustrating a method for detecting relative humidity inside an electrical machine according to one or more embodiments of the present disclosure.

FIG. 4 is a flow diagram illustrating the method for detecting relative humidity inside electrical machines according to embodiments of the present disclosure. As described in detail above, in step 400, a measured ROC value corresponding to a rise in temperature inside an electrical machine is determined. A reference ROC value corresponding to a rise in temperature inside the same electrical machine is then obtained in step 402. A ratio of the measured ROC to the reference ROC is determined in step 404. The ratio is equal to an average specific heat of the electrical machine. In step 406, the average specific heat of the electrical machine is compared to a set of known specific heat values of dry air and water corresponding to a set of known relative humidity values for a range of air temperature values. A relative humidity value corresponding to the relative humidity of the electrical machine is estimated based on the comparison in step 408.

The present invention is directed to detecting relative humidity inside electrical machines through an engineered logic. Rather than installing a humidity sensor inside a machine frame, the method according to embodiments of the present disclosure detects relative humidity inside the machine without requiring a physical modification to the machine. The method described herein provides a significant advantage over physical modifications to machines. For instance, physical changes to a machine operating in a classified area is complex and may void certification of the machine to operate in such areas.

Furthermore, the method according to embodiments of the present disclosure enhances the reliability of the insulation system and mechanical components of electric machines, such as electric rotating machines, by monitoring humidity levels. If the relative humidity value of a machine is determined to exceed a predetermined threshold value, the machine may be prevented from re-starting and sent to be overhauled. In one or more embodiments, an alert, such as an auditory alarm, may be generated to notify a user to schedule maintenance for the machine.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A method for estimating relative humidity inside an electrical machine, comprising:
   determining a measured rate of change (ROC) of a temperature inside the electrical machine;

determining a reference ROC of a temperature inside the electrical machine;

calculating a ratio of the measured ROC to the reference ROC, wherein the ratio is equal to an average specific heat of the electrical machine;

determining an air temperature value for the electrical machine;

comparing the average specific heat of the electrical machine and the air temperature value to a set of known specific heat values of dry air and water corresponding to a set of known relative humidity values for a range of air temperature values, thereby generating a comparison; and estimating a relative humidity value inside the electrical machine based on the comparison.

2. The method of claim 1, wherein the electrical machine is an electrical motor.

3. The method of claim 1, further comprising shutting down the electrical machine when the relative humidity value exceeds a predetermined threshold value.

4. The method of claim 1, further comprising preventing the electrical machine from re-starting when the relative humidity value exceeds a predetermined threshold value.

5. The method of claim 1, further comprising generating an alert when the relative humidity value exceeds a predetermined threshold value.

6. The method of claim 1, wherein the measured ROC is measured during a starting operation of the electrical machine, and wherein the reference ROC is measured during a starting operation of the electrical machine.

7. The method of claim 1, wherein the measured ROC is measured during a shutdown operation of the electrical machine, and wherein the reference ROC is measured during a shutdown operation of the electrical machine.

8. The method of claim 1, wherein determining the measured ROC comprises obtaining a resistance temperature detector (RTD) reading for the electrical machine during a starting operation or a shutdown operation, and wherein determining the reference ROC comprises obtaining a reference RTD reading for the electrical machine during a corresponding starting or shutdown operation.

9. The method of claim 8, further comprising:
obtaining an ambient temperature value;
determining a difference $T_2$ between the RTD reading and the ambient temperature value; and
determining a difference $T_1$ between the reference RTD reading and the ambient temperature value.

10. The method of claim 9, wherein the ratio of the measured ROC to the reference ROC is calculated according to the following:

$$\frac{\left(\frac{dT}{dt}\right)_1}{\left(\frac{dT}{dt}\right)_2},$$

where t denotes a time from when the starting operation or the shutdown operation occurred to when thermal energy was produced by the electrical machine.

11. The method of claim 8, wherein the air temperature value is determined using the RTD reading.

12. A system for estimating relative humidity inside an electrical machine, comprising:
an electrical machine;
one or more temperature sensors proximate the electrical machine configured for obtaining a set of temperature measurements for the electrical machine during a starting operation or a shutdown operation and an air temperature value;
an analysis unit configured for:
determining a measured rate of change (ROC) of a temperature inside the electrical machine based on the set of temperature measurements;
determining a reference ROC of a temperature inside the electrical machine;
calculating a ratio of the measured ROC to the reference ROC, wherein the ratio is equal to an average specific heat of the electrical machine;
comparing the average specific heat of the electrical machine and the air temperature value to a set of known specific heat values of dry air and water corresponding to a set of known relative humidity values for a range of air temperature values, thereby generating a comparison; and
estimating a relative humidity value inside the electrical machine based on the comparison; and
a control unit configured for causing a mechanical operation to be performed based on the estimated relative humidity value.

13. The system of claim 12, wherein the electrical machine is an electrical motor.

14. The system of claim 12, wherein the mechanical operation comprises shutting down the electrical machine when the relative humidity value exceeds a predetermined threshold value.

15. The system of claim 12, wherein the mechanical operation comprises preventing the electrical machine from re-starting when the relative humidity value exceeds a predetermined threshold value.

16. The system of claim 12, wherein the mechanical operation comprises generating an alert when the relative humidity value exceeds a predetermined threshold value.

* * * * *